United States Patent [19]
Mikkor

[11] Patent Number: 4,969,359
[45] Date of Patent: Nov. 13, 1990

[54] SILICON ACCELEROMETER RESPONSIVE TO THREE ORTHOGONAL FORCE COMPONENTS AND METHOD FOR FABRICATING

[75] Inventor: Mati Mikkor, Ann Arbor, Mich.
[73] Assignee: Ford Motor Company, Dearborn, Mich.
[21] Appl. No.: 334,253
[22] Filed: Apr. 6, 1989
[51] Int. Cl.[5] .............................................. G01P 15/12
[52] U.S. Cl. ..................... 73/517 R; 338/5; 338/46
[58] Field of Search ................. 73/517 R, 651; 338/2, 338/5, 46

[56] References Cited

U.S. PATENT DOCUMENTS

| | | |
|---|---|---|
| 3,304,787 | 2/1967 | Chiku et al. ............. 73/517 R |
| 4,071,838 | 1/1978 | Block . |
| 4,244,225 | 1/1981 | Greenwood . |
| 4,342,227 | 8/1982 | Petersen et al. .......... 73/517 R |
| 4,430,895 | 2/1984 | Colton . |
| 4,553,436 | 11/1985 | Hansson . |
| 4,597,003 | 6/1986 | Aine et al. ................ 73/514 |
| 4,600,934 | 7/1986 | Aine et al. ................ 73/517 R |
| 4,641,539 | 2/1987 | Vilimek . |
| 4,653,326 | 3/1987 | Danel et al. . |
| 4,670,092 | 6/1987 | Motamedi ............... 73/517 R |
| 4,776,924 | 10/1988 | Delapierre ............... 73/517 R |

FOREIGN PATENT DOCUMENTS 62-118260 5/1987 Japan ................................. 73/514

OTHER PUBLICATIONS

"Tuning Forks in Silicon", by Rudolf A. Buser, Nico F. de Rooij; pp. 94 & 95 of IEEE Catalog Number 89TH0249-3, Micro Electro Mechanical Systems, dated Feb. 20-22, 1989.

"Realization of a Mesa Array in (001) Oriented Silicon Wafers for Tactile Sensing Applications", by R. Buser, B. Stauffer, N. F. DeRooij; pp. 879 & 800 of Extended Abstracts of the Electrochemical Society, vol. 86-2, dated Oct. 19-24, 1986.

Primary Examiner—John Chapman
Attorney, Agent, or Firm—Allan J. Lippa; Peter Abolins

[57] ABSTRACT

An accelerometer fabricated from silicon which is responsive to the three orthogonal components of an applied force. A method is also disclosed for etching the accelerometer from a single silicon substrate. Three rectangular beams or cantilevers are formed each having vertical sidewalls lying in crystalline planes orthogonal to one another. Each of the beams is directly responsive to one of the three orthogonal force components.

4 Claims, 4 Drawing Sheets

SILICON ACCELEROMETER RESPONSIVE TO THREE ORTHOGONAL FORCE COMPONENTS AND METHOD FOR FABRICATING

BACKGROUND OF THE INVENTION

The field of the invention relates to sensors etched from silicon for sensing an applied force. In a particular aspect of the invention, the sensor is utilized as an accelerometer for sensing a force of acceleration. In another aspect, the invention relates to methods for fabricating such accelerometers by etching silicon substrates.

Accelerometers are known having a cantilever which deflects in response to a force of acceleration. Conventional electronic sensing circuitry, such as resistive strain gages attached to the cantilever, provide an electrical measurement related to the acceleration force. It is also known to form the cantilevers of accelerometers by etching silicon substrates thereby achieving the advantage of batch processing techniques known in the semiconductor industry. For example, U.S. Pat. No. 4,653,326 issued to Danel et al discloses etching a cantilever from a silicon substrate which deflects in response to a force component applied in only one direction, parallel to the substrate in this example. Capacitive plates coupled to the cantilever provide an electrical measurement proportional to the applied force.

A problem with these types of accelerometers is that only one force component is detectable. In applications which require detecting all three components of an acceleration force, three separate sensors are needed thereby adding complexity.

U.S. Pat. No. 4,342,227 issued to Petersen et al discloses an accelerometer fabricated by first etching V-shaped grooves, having sidewalls lying in the {111} crystalline planes, into the planar surface of a silicon substrate. Two sets of grooves at right angles are formed and capacitor electrodes defused into the {111} walls. An epitaxial layer is grown over the grooved substrate and an insulation layer grown over the epitaxial layer. A conductive layer is then deposited on the insulation layer to define an electrode. The substrate is again subjected to anisotropic etching for cutting the epitaxial layer from under the insulating layer thereby defining a cantilever beam suspended over the V groove. Since two perpendicular cantilevers are formed, two of the three acceleration force components may be detected. A difficulty appears to be in detecting a third force component normal to the substrate. Allegedly, the cantilevers move in both lateral and up/down directions. Discriminating electronic circuitry and associated calculations are then used in an effort to detect the normal force component. Applicant contends that there is a complex relationship between the electrical measurement and normal force component thereby resulting in a complex and possibly inaccurate calculation of the normal component. In addition, there are apparent fabrication complexities in suspending the cantilevers over the V grooves.

The inventor herein has recognized numerous disadvantages of prior approaches. No prior accelerometer known to inventor has provided accurate measurement of the three orthogonal force components without the need for complex circuitry and calculations. Further, no known prior accelerometers have been fabricated from a single substrate wherein the accelerometer is directly responsive to the three orthogonal force components.

SUMMARY OF THE INVENTION

An object of the invention herein is to provide an accelerometer, and a process for etching the accelerometer from a single silicon substrate, having three orthogonal cantilevers or beams wherein each is directly responsive to one of the three orthogonal components of an applied force.

The above object is achieved, and disadvantages of prior approaches overcome, by providing an accelerometer directly responsive to the three orthogonal components of an applied force, and a method for fabricating the accelerometer from a single silicon substrate. In one particular aspect of the invention, the accelerator comprises: a supporting frame etched from a silicon substrate having nominal planes lying in a set of {100} crystalline planes; a first rectangular beam etched from the substrate and longitudinally extending from the frame for detecting the first orthogonal component of the applied force, the first rectangular beam having vertical sidewalls lying in a first crystalline plane of the set of {100} crystalline planes; a second rectangular beam etched from the substrate and longitudinally extending from the frame for detecting the second orthogonal component of the applied force, the second rectangular beam having vertical sidewalls lying in a second crystalline plane of the set of {100} crystalline planes orthogonal to the first crystalline plane; and a third rectangular beam etched from the substrate and longitudinally extending from the frame for detecting the third orthogonal component of the applied force, the third rectangular beam having horizontal sidewalls lying in a third crystalline plane of the set of {100} crystalline planes orthogonal to both the first and the second crystalline planes.

By providing three rectangular beams, each having vertical sidewalls lying in crystalline planes orthogonal to one another, an advantage is obtained of directly measuring the three orthogonal components of an applied force. Thus, the exact direction and magnitude of the applied forced are obtained from a single accelerometer. Another advantage is that the cleavage planes of each rectangular beam are at 45° angles thereby providing less likelihood of fracture then heretofore possible. More specifically, the {111} planes of each beam intersect the top surface of each beam at a 45° angle whereas in previous approaches the {111} planes intersected top surfaces at 90° angles which were therefore more likely to fracture.

In another aspect of the invention the accelerometer comprises a supporting frame etched from a silicon substrate having nominal planes lying in a set of {100} crystalline planes; a first abutment etched from the substrate and having adjacent sidewalls lying substantially in a set of {111} crystalline planes; a second abutment etched from the substrate and having adjacent sidewalls lying substantially in a set of {111} crystalline planes; a first rectangular beam etched from the substrate and longitudinally extending from the first abutment for detecting the first orthogonal component of the applied force, the first rectangular beam having vertical sidewalls lying in a first crystalline plane of the {100} crystalline planes, the vertical sidewalls forming approximately a 135 degree angle with the first abutment; a second rectangular beam etched from the substrate and longitudinally extending from the second abutment for detecting the second orthogonal component of the applied force, the second rectangular beam having vertical sidewalls lying in a second crystalline plane of the {100} crystalline planes orthogonal to the first crystalline plane, the vertical sidewalls forming approximately a 135 degree angle with the second abutment; and a third rectangular beam etched from the substrate and longitudinally extending from the frame for detecting the third orthogonal component of the applied force, the third rectangular beam having horizontal sidewalls lying in a third crystalline plane of the {100} crystalline planes orthogonal to both the first and the second crystalline planes.

This aspect of the invention, having abutments intersecting each beam at 135° angles, provides an advantage of reduced stresses applied to each beam during deflection.

In still another aspect of the invention, a method for fabricating an accelerometer responsive to three orthogonal components of an applied force is provided. More specifically, the method comprises the steps of: preparing a silicon substrate having nominal planes lying in a set of {100} crystalline planes and {111} crystalline planes intersecting the {100} crystalline planes in <110> crystalline directions; anisotropically etching a first rectangular beam responsive to the first orthogonal force component and having vertical sidewalls lying in a first crystalline plane of the {100} crystalline planes; anisotropically etching a second rectangular beam responsive to the second orthogonal force component and having vertical sidewalls lying in a second crystalline plane of the {100} crystalline planes orthogonal to the first crystalline plane; and anisotropically etching a third rectangular beam responsive to the third orthogonal force component and having horizontal sidewalls lying in a third crystalline plane of the {100} crystalline planes orthogonal to both the first and second crystalline planes.

The aspect of the invention cited above provides an advantage of etching an accelerometer responsive to the three orthogonal components of an applied force from a single silicon wafer. No additional steps, such as bonding added structures to the wafer or fabricating added structure by growing polysilicon layers are required. Thus, an advantage is obtained of fabricating an accelerometer from a single wafer by simple etching processes.

BRIEF DESCRIPTION OF THE DRAWINGS

The above object and advantages may be better understood by reading the description of a preferred embodiment with reference to the following drawings wherein.

DESCRIPTION OF THE PREFERRED EMBODIMENT

Figure 1:
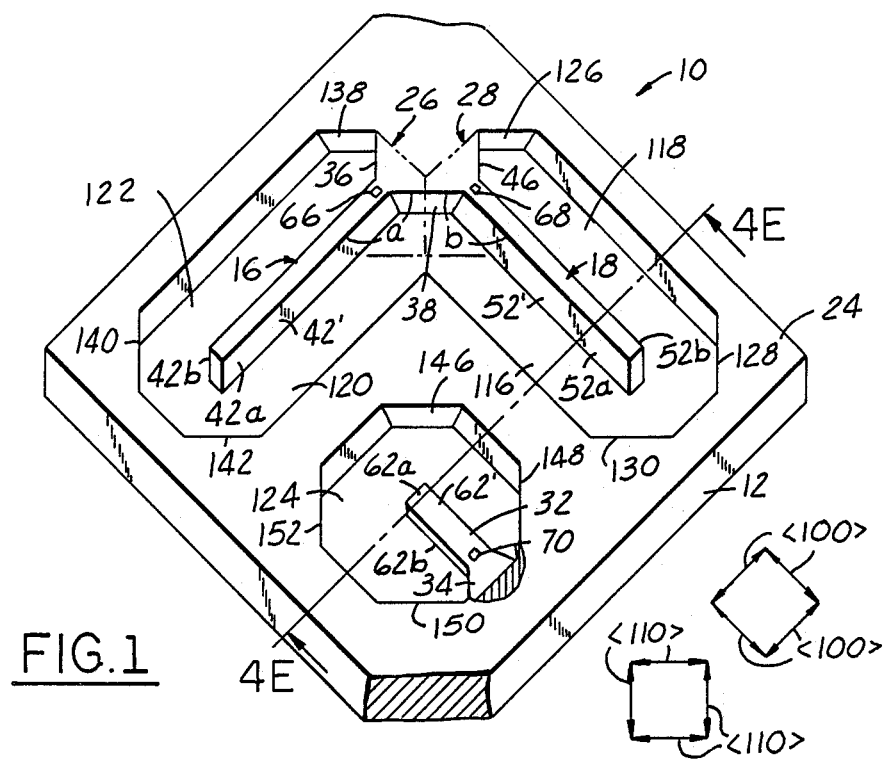
FIG. 1 is a perspective view of an accelerometer constructed in accordance with the teachings of the invention.

Referring to FIG. 1, an example of an accelerometer fabricated in accordance with the teachings of the invention is shown. Accelerometer 10 is shown fabricated from silicon substrate 12 having nominal planes lying in the set of {100} crystalline planes. As described in greater detail hereinafter with particular reference to FIGS. 4A–4E, substrate 12 is etched to form rectangular beams 16 and 18 extending from supporting frame 24 via respective abutments 26 and 28. Rectangular beam 32 is also formed extending from frame 24 by abutment 34.

Abutment 26 is shown including abutment wall 36 orientated in a plane of the {111} set of crystalline planes and extending in a <110> crystalline direction from frame 24. Abutment 26 also includes a portion of abutment wall 38 extending in a <110> crystalline direction and lying in another plane of the {111} set of crystalline planes. Rectangular beam 16, a cantilever in this example, is shown extending from abutment 26 in a <100> crystalline direction and having vertical sidewalls 42a and 42b lying in plane 42' of the {100} set of crystalline planes. Abutment 26 forms a 135° angle with beam 16.

Similarly, abutment 28 is shown including abutment wall 46 extending in a <110> crystalline direction from frame 24 and lying in a plane of the {111} set of crystalline planes. Abutment 28 also includes a portion of abutment wall 38 which is in another plane of the {111} set of crystalline planes and extends in a <110> crystalline direction. Cantilever or rectangular beam 18 is shown extending from abutment 28 in a <100> crystalline direction and having vertical sidewalls 52a and 52b lying in plane 52' of the {100} set of crystalline planes. Abutment 28 forms a 135° angle with beam 18.

Rectangular beam 32, a cantilever in this example, is shown extending from frame 24, via abutment 34, in a <100> crystalline direction and having horizontal sidewalls 62a and 62b each lying in crystalline plane 62' of the set of {100} crystalline planes. Abutment 34 is shown forming a 135° angle with beam 42.

By way of example, in applications where substrate 12 is oriented such that its planar surface is in the (100) crystalline plane; then beam 16 extends in a [100] crystalline direction and plane 42' is a (010) plane of the set of {100} planes; beam 18 extends in a [010] crystalline direction and plane 52' is a (100) plane; beam 32 extends in a [010] direction and plane 62' is a (100) crystalline plane. Beam 16 then vibrates in a [010] direction, beam 18 in a [100] direction, and beam 32 in a [001] direction.

Since crystalline planes 42', 52' and 62' of the set of {100} crystalline planes are each orthogonal to one another, vertical sidewalls 42a-b of beam 16, vertical sidewalls 52a-b of beam 18, and horizontal sidewalls 62a-b of beam 32 are each orthogonal to one another. Accordingly, beams 16, 18, and 32 are each deflectable in response to one of the orthogonal components of an applied force. An accurate determination of force direction and magnitude is therefore obtainable by simple calculation from a single accelerometer. An advantage is thereby obtained over prior approaches which required multiple accelerometers or complex force calculations.

Abutments 26 and 28 support respective beams 16 and 18 at 135° angles a and b, respectively, thereby reducing stresses caused by beam loading. Further, the set of {111} crystalline planes, which define cleavage planes of beams 16, 18, and 32, intersect the beams at 45° angles whereas the cleavage planes of prior approaches intersected the beams at 90° angles (i.e. the intersection of {111} crystalline planes with {100} nominal planes). Accordingly, beams 16, 18, and 32 are less prone to fracture then heretofore possible.

For the particular example shown in FIG. 1, conventional strain gages 66, 68, and 70 are shown coupled to respective beams 16, 18, and 32 for electrically measuring beam deflection in response to the applied force. Since each beam is directly responsive to one of the three orthogonal force components, the electrical output corresponding to each strain gage is directly related to one orthogonal component of the applied force. It is noted that other conventional electrical methods for measuring beam deflection may also be used to advantage such as piezoelectric devices or capacitive plates.

The process steps for fabricating accelerometer 10 are now described with reference to the top view of etchant mask openings 82 and 90 shown in FIG. 2, the bottom view of etchant mask openings 94 and 98 shown in FIG. 3, and the cross-sectional view shown in FIGS. 4A-4E of various process steps during fabrication.

Figure 2:
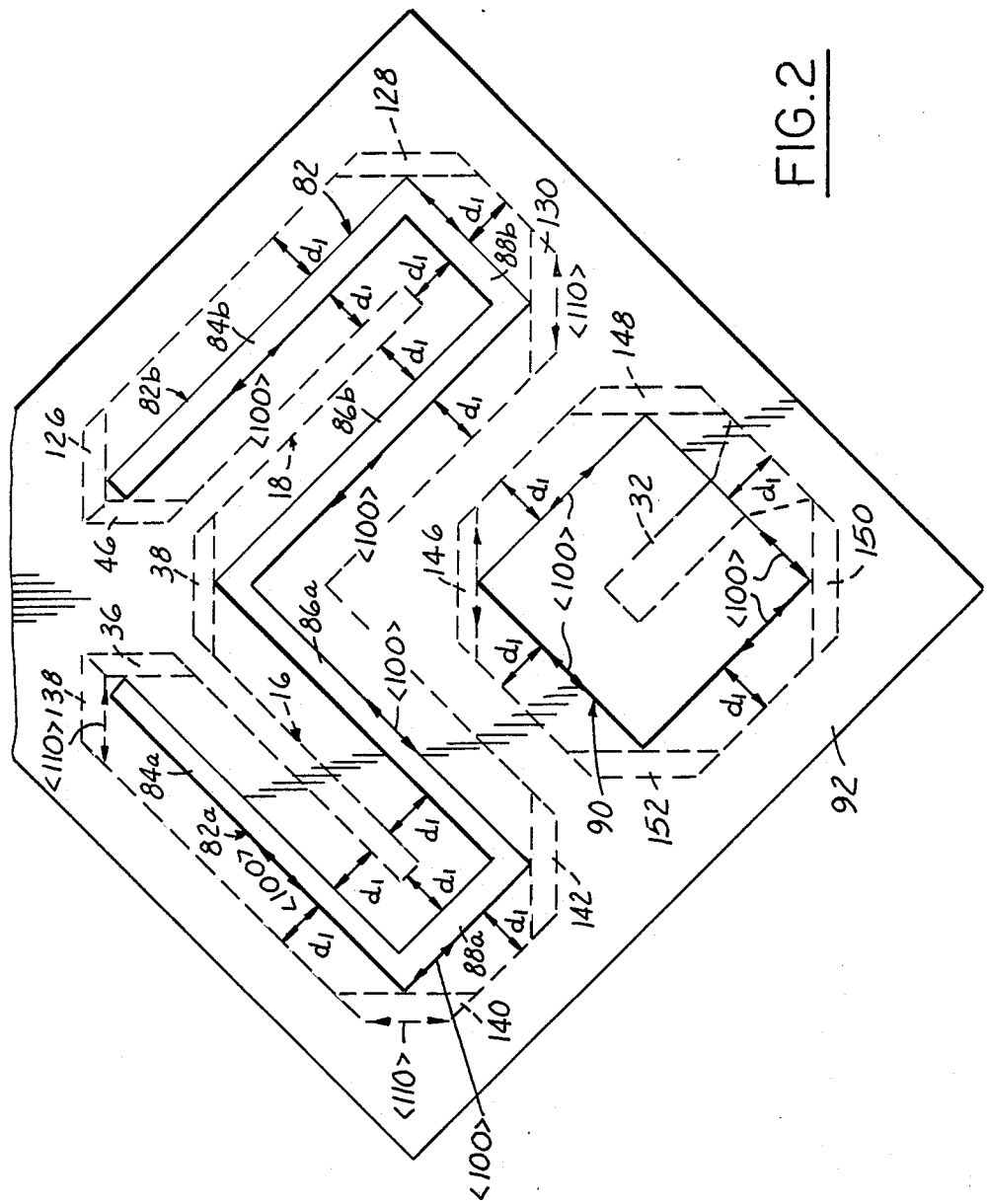
FIG. 2 illustrates a top view of the etchant masks utilized during the process steps with phantom lines illustrating the accelerometer after fabrication.

Referring first to FIG. 2, mask opening 82 is shown having mask segments 82a and 82b aligned in <100> crystalline directions on top planar surface 92 of substrate 12. Mask segment 82a includes mask openings 84a and 86a each shown as a longitudinally extending rectangular opening symmetrically positioned parallel to the length of beam 16. Mask segment 82a also includes mask opening 88a shown as a laterally extending rectangular opening extending between mask openings 84a and 86a. Rectangular mask openings 84a, 86a, and 88a are shown aligned in <100> crystalline directions and symmetrically positioned about the desired location of beam 16 (shown in phantom lines) for defining its dimensions (width and length) as described in greater detail later herein with particular reference to FIGS. 4A-4E.

Similarly, mask segment 82b includes longitudinally extending rectangular openings 84b and 86b, and laterally extending rectangular opening 88b. Mask openings 84b, 86b, and 88b are shown aligned in <100> crystalline directions on top planar surface 92 of substrate 12. Mask openings 84b, 86b, and 88b are shown symmetrically positioned around the desired location and dimensions (width and length) of beam 18 (shown in phantom lines).

Mask opening 90 is shown as an etchant opening aligned in <100> crystalline directions on top planar surface 92 of substrate 12. As described later herein with particular reference to FIGS. 4A-4E, mask opening 90 defines the depth of beam 32 and suspends beam 32 from frame 24.

Figure 3:
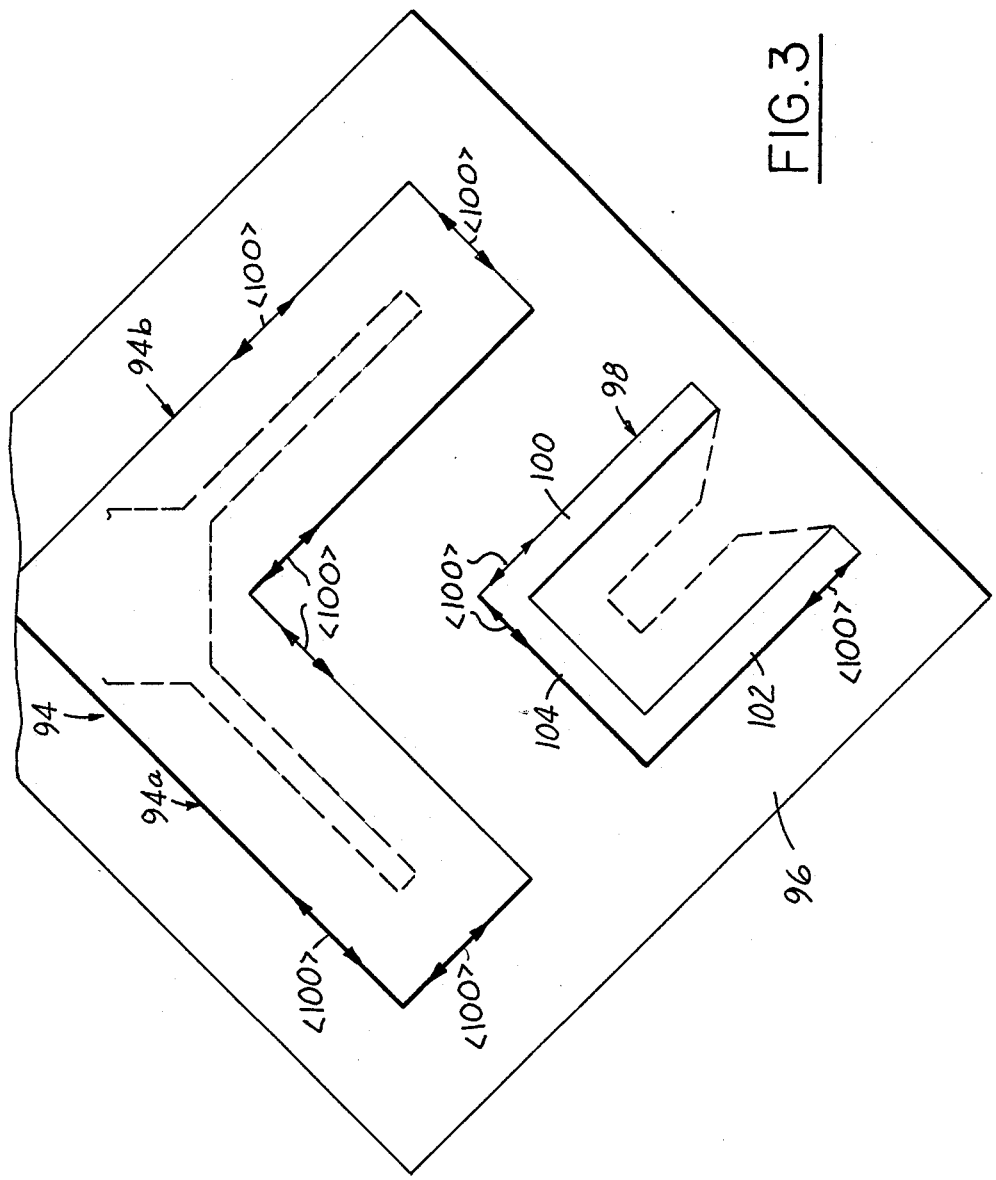
FIG. 3 illustrates a bottom view of the etchant masks utilized during the process steps.

Referring to the bottom view shown in FIG. 3, etchant mask opening 94 is shown including etchant mask openings 94a and 94b, each aligned in <100> crystalline directions on bottom surface 96 of substrate 12. Mask openings 94a and 94b are symmetrically positioned around the desired locations of beams 16 and 18. As described later herein with particular reference to FIGS. 4A-4E, the positioning of mask openings 94a and 94b define the depth of beams 16 and 18, and suspend the beams from frame 24.

Mask opening 98 is shown aligned in <100> crystalline directions on bottom planar surface 96 and symmetrically positioned around the desired location of beam 32. More specifically, mask opening 98 includes longitudinally extending rectangular openings 100 and 102, and laterally extending rectangular opening 104. The positioning of mask opening 98 defines the length and width of beam 32 as described in more detail hereinafter with particular reference FIGS. 4A-4E.

Figure 4A:
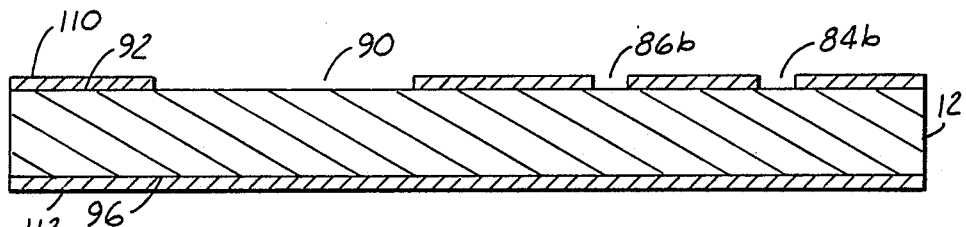
FIGS. 4A–4E illustrate various process steps in fabricating the embodiment shown in FIG. 1 as viewed along lines 4E–4E in FIG. 1.

Process steps for fabricating accelerometer 10 are now described with reference to FIGS. 4A-4E. Referring first to FIG. 4A, substrate 12 is shown having silicon oxide layers 110 and 112 grown on respective upper and lower substrate surfaces 92 and 96 in a conventional manner. For long etching times, silicon oxide layers 110 and 112 are covered by silicon nitride layers which are more resistant to silicon etches than the oxide layers. Upper layer 110 is shown having mask openings 90, 84b, 86b, 88b (FIG. 2), 84a (FIG. 2), 86a (FIG. 2), and 88a (FIG. 2) formed thereon by conventional photolithographic processes.

Figure 4B:
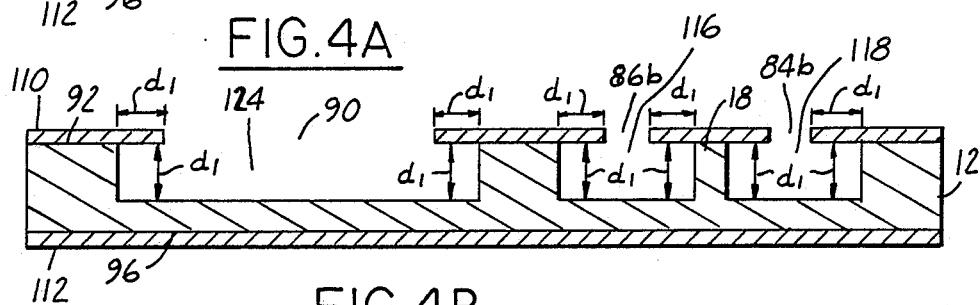

Referring to FIG. 4B, an anisotropic etchant, such as aqueous potassium hydroxide, is applied to mask openings 90, 84b, 86b, 88b (FIG. 2), 84a (FIG. 2), 86a (FIG. 2), 88a (FIG. 2). The etchant acts against the set of {100} crystalline planes at a rate approximately 40 to 100 times greater then it acts against the set of {111} crystalline planes. During the time of the etchant step, the etchant acts downward against the nominal {100} planes at the same rate it etches laterally against the set of {100} planes such that the etchant depth (d1) and width (d1) are the same. This etchant step is timed such that cavities 116, 118, 120 (FIG. 1), 122 (FIG. 1), and 124 are etched to the desired depth d1. The spacing between cavities 116 and 118 defines the width of beam 18. Similarly, the spacing between cavities 120 (FIG. 1) and 122 (FIG. 1) defines the width of beam 16. As described in greater detail later herein, the spacing between cavity 124 and bottom surface 96 of substrate 12 defines the depth of beam 32.

Referring back to FIG. 2, the etchant will act along the [111] planes intersecting at the outside corners of mask openings 84b, 86b, 88b, 84a, 86a, 88a, and 90, such that sloping sidewalls 36, 46, 126, 128, 130, 138, 140, 142, 146, 148, 150, and 152 are formed at an angle of 54.7° from top planar surface 92.

Figure 4C:
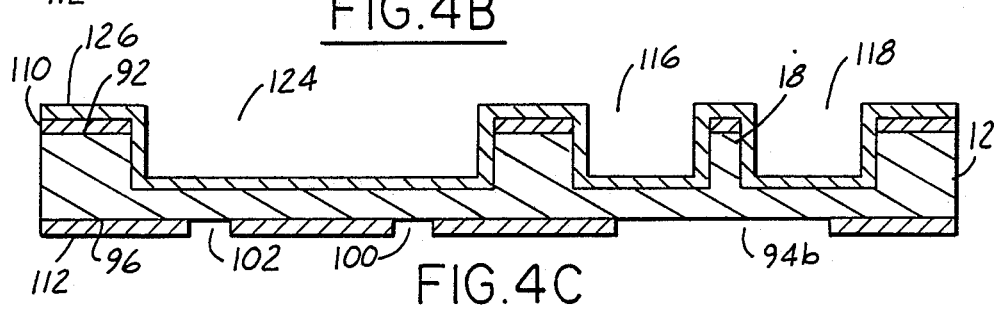

Referring now to FIG. 4C, passivation layer 126, such as silicon oxide or silicon nitride, is grown over top surface 92 of substrate 12 to prevent further etching against top surface 92. Bottom layer 112 is then patterned by conventional photolithographic processes to define mask opening 94 (FIG. 3), which includes rectangular mask openings 94a and 94b. As shown in FIG. 3, mask openings 94a and 94b are aligned in <100> crystalline directions and symmetrically positioned around beams 16 and 18. Concurrently, mask opening 98, including longitudinally extending mask openings 100 and 102, and laterally extending mask opening 104 are formed in bottom layer 112. Mask openings 100, 102, and 104 are aligned in <100> crystalline directions and symmetrically positioned around the desired location of beam 32 for defining the length and width of beam 32.

Figure 4D:
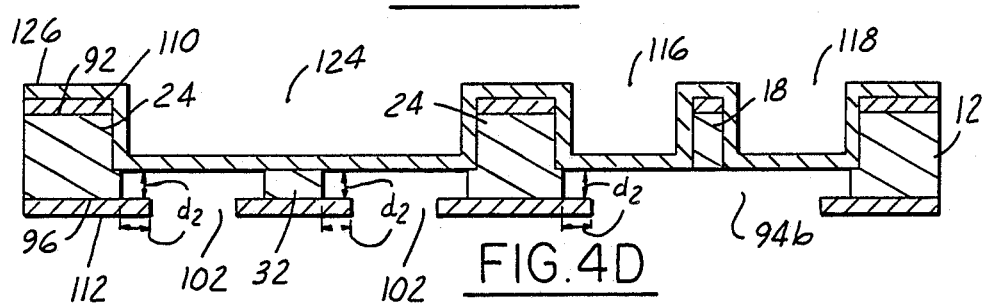
Figure 4E:
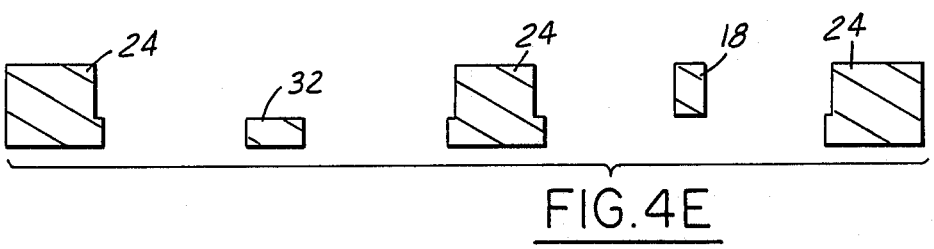

As shown in FIG. 4D, the etchant is applied to mask openings 94b, 94a (FIG. 3), 100, 102, and 104 (FIG. 3). The etchant against the nominal {100} planes to a depth d2 and also laterally against intersecting {100} planes to a width d2. This etchant process is timed such that depth d2 is sufficient to etch through bottom surface 96 of substrate 12 into cavities 116, 118, 120 (FIG. 1), 122 (FIG. 1), and 124. Accordingly, beams 16, 18, and 32 are freely suspended from frame 24. Further, the width of beam 32 is defined by this last etchant process. Afterwards, layers 110, 112, and 126 are removed by a conventional etchant process thereby defining accelerometer 10 as shown in FIG. 4E.

The above sequence of processing steps is one of many. For those skilled in the art, different sequences come to mind, for example the mask openings in passivation layer of wafer 12 can be opened simultaneously on the top and bottom side of the wafer. Silicon substrate 12 is then etched to a depth $d_2$ and a passivation layer then applied to bottom planar surface 96 to prevent further etching from this surface. Etching is continued from top planar surface 92 until beams 16, 18 and 32 are freed.

Figure 5:
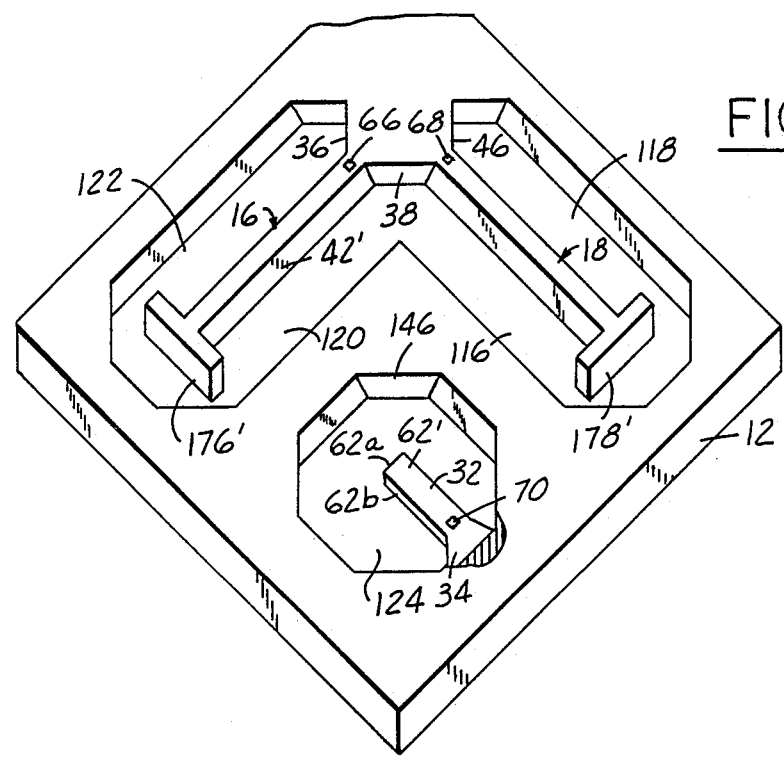
FIG. 5 illustrates an alternate embodiment of an accelerometer.

An alternate embodiment of an accelerometer (10') is shown FIG. 5 wherein like parts are referenced with like numerals to accelerometer 10 shown in FIG. 1. Accelerometer 10' is similar to accelerometer 10 with the exception that suspended masses 176' and 178' are fabricated at the ends of respective beams 16' and 18' by similar processes to those disclosed with reference to FIGS. 4A-4E.

One should note that the free ends of the beams 16, 18 and 32 shown in FIGS. 1 and 5 will actually not be rectangular, but will be tapered by slightly faster etching planes than the {100} planes. These planes make approximately a 19° angle with the beam axis. Similarly, the configuration of the end masses 178' and 176' at the beam ends shown in FIG. 5 will be slightly modified. The embodiment shown in FIG. 5 illustrating beam ends can be made more massive to increase the sensitivity of cantilevers to an applied force.

This concludes the description of the preferred embodiment. The reading of it by those skilled in the art will bring to mind many alterations and modifications without departing from the spirit and scope of the invention. For example, the accelerometer described and methods for fabricating the accelerometer are applicable to other forms of silicon substrates and orientations of silicon substrates other than those shown herein. Accordingly, it is intended that the scope of the invention be limited only by the following claims.

What is claimed:

1. An accelerometer responsive to three orthogonal components of an applied force, comprising:

a supporting frame etched from a silicon substrate having top and bottom surfaces lying in a set of <100> crystalline planes;

a first abutment etched from said substrate and having adjacent sidewalls lying substantially in a set of <111> crystalline planes;

a second abutment etched from said substrate and having adjacent sidewalls lying substantially in a set of <111> crystalline planes;

a first rectangular beam etched from said substrate and longitudinally extending from said first abutment for detecting the first orthogonal component of the applied force, said first rectangular beam having vertical sidewalls lying in a first crystalline plane of said <100> crystalline planes, said vertical sidewalls forming approximately a (b 135 degree angle with said first abutment;

a second rectangular beam etched from said substrate and longitudinally extending from said second abutment for detecting the second orthogonal component of the applied force, said second rectangular beam having vertical sidewalls lying in a second crystalline plane of said <100> crystalline planes orthogonal to said first crystalline plane, said vertical sidewalls forming approximately a 135 degree angle with said second abutment; and a third rectangular beam etched from said substrate and longitudinally extending from said frame for detecting the third orthogonal component of the applied force, said third rectangular beam having horizontal sidewalls lying in a third crystalline plane of said <100> crystalline planes orthogonal to both said first and said second crystalline planes.

2. The accelerometer recited in claim 8 further comprising a third abutment formed between said frame and said third beam, said third abutment forming approximately a 135 degree angle with said third rectangular beam.

3. The accelerometer recited in claim 8 further comprising a mass suspended from an end of each of said rectangular beams.

4. The accelerometer recited in claim 8 wherein said substrate further comprises a first cavity partially surrounding said first rectangular beam and a second cavity partially surrounding said second rectangular beam and a third cavity partially surrounding said third rectangular beam.

* * * * *

UNITED STATES PATENT AND TRADEMARK OFFICE
CERTIFICATE OF CORRECTION

PATENT NO. : 4,969,359
DATED : November 13, 1990
INVENTOR(S) : Mikkor

It is certified that error appears in the above-identified patent and that said Letters Patent is hereby corrected as shown below:

Column 8, line 16, delete "(b".

Column 8, line 34, substitute --1-- for "8".

Column 8, line 39, substitute --1-- for "8".

Column 8, line 42, substitute --1-- for "8".

Signed and Sealed this

Second Day of June, 1992

Attest:

DOUGLAS B. COMER

*Attesting Officer*  *Acting Commissioner of Patents and Trademarks*